(12) United States Patent
Lim et al.

(10) Patent No.: US 8,798,073 B2
(45) Date of Patent: Aug. 5, 2014

(54) METHOD OF PERFORMING UPLINK SCHEDULING

(75) Inventors: Kwang Jae Lim, Daejeon (KR); Chul Sik Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 616 days.

(21) Appl. No.: 12/738,740

(22) PCT Filed: Aug. 5, 2008

(86) PCT No.: PCT/KR2008/004547
§ 371 (c)(1),
(2), (4) Date: Apr. 19, 2010

(87) PCT Pub. No.: WO2009/054604
PCT Pub. Date: Apr. 30, 2009

(65) Prior Publication Data
US 2010/0208687 A1    Aug. 19, 2010

(30) Foreign Application Priority Data
Oct. 24, 2007    (KR) .................. 10-2007-0107239
Mar. 11, 2008    (KR) .................. 10-2008-0022613

(51) Int. Cl.
*H04L 12/28*    (2006.01)
*H04W 4/00*    (2009.01)

(52) U.S. Cl.
USPC ........ 370/395.4; 370/206; 370/295; 370/341; 370/480; 455/63.1; 455/114.2; 455/278.1; 455/296

(58) Field of Classification Search
USPC ............. 370/395.4, 329, 206, 295, 328, 341, 370/430, 461, 480, 482; 455/63.1, 63.2, 455/63.3, 114.2, 115.3, 278.1, 283, 288, 455/296
See application file for complete search history.

(56) References Cited

U.S. PATENT DOCUMENTS 6,546,058 B1    4/2003  Gilhousen et al.
7,146,175 B2 *  12/2006 Rune et al. .................. 455/453

(Continued)

FOREIGN PATENT DOCUMENTS

WO    2007/112547 A1    10/2007

OTHER PUBLICATIONS

Jae-Heung Yeom et al., "Mitigation of Inter-Cell Interference in the WiMAX System," Mobile WiMAX Symposium, 2007, IEEE, Mar. 25-29, 2007, pp. 26-31.
Nicola Riato et al., "Interference Mitigation Strategies for WiMAX Networks," Wireless Communication Systems, 2007, ISWCS 2007 4$^{th}$ International Symposium, Oct. 17-19, 2007, pp. 175-179.
Chunwei He et al., "Co-channel Interference Mitigation in MIMO-OFDM System," Wireless Communications, Networking and Mobile Computing, 2007, WiCom 2007 International Conference, Sep. 21-25, 2007, pp. 204-208.
"Medium Access Control Layer for Ultra Mobile Broadband (UMB) Air Interface Specification," 3GPP2 C.S0084-002-0, Version 1.0, Apr. 2007, 284 pages.
International Search Report for PCT/KR2008-004547, mailed on Dec. 29, 2008.

*Primary Examiner* — Benjamin H Elliott, IV
(74) *Attorney, Agent, or Firm* — Staas & Halsey LLP (57) ABSTRACT

The present invention is provided to perform uplink scheduling of a mobile station. In order to perform the uplink scheduling of the mobile station located in a service cell, a base station receives a plurality of interference amounts each corresponding to a plurality of frequency bands associated with an uplink in at least one adjacent cell corresponding to the mobile station from the base station of at least one adjacent cell, respectively, and calculates a plurality of interference values each corresponding to the plurality of frequency bands by using the plurality of interference amounts each corresponding to at least one adjacent cell. In addition, the base station generates scheduling control information corresponding to the mobile station by using the plurality of interference values and transmits the scheduling control information to the mobile station.

14 Claims, 4 Drawing Sheets

(56) References Cited

U.S. PATENT DOCUMENTS

| | | | |
|---|---|---|---|
| 7,706,804 B2* | 4/2010 | Huh et al. | 455/450 |
| 2002/0145968 A1 | 10/2002 | Zhang et al. | |
| 2003/0098682 A1* | 5/2003 | Jin et al. | 324/76.21 |
| 2006/0292989 A1* | 12/2006 | Gerlach et al. | 455/63.1 |
| 2007/0042784 A1* | 2/2007 | Anderson | 455/450 |
| 2007/0218840 A1* | 9/2007 | Gerlach et al. | 455/63.2 |
| 2007/0230375 A1* | 10/2007 | Yomo et al. | 370/280 |
| 2008/0057934 A1* | 3/2008 | Sung et al. | 455/422.1 |
| 2009/0196192 A1* | 8/2009 | Lim et al. | 370/252 |
| 2010/0105406 A1* | 4/2010 | Luo et al. | 455/452.2 |
| 2010/0208687 A1* | 8/2010 | Lim et al. | 370/329 |

* cited by examiner

METHOD OF PERFORMING UPLINK SCHEDULING

CROSS REFERENCE TO RELATED APPLICATIONS

This application claims the benefit under 35 U.S.C. Section 371, of PCT International Application No. PCT/KR2008/004547, filed Aug. 5, 2008, which claimed priority to Korean Application Nos. 10-2007-0107239, filed Oct. 24, 2007, and 10-2008-0022613, filed Mar. 11, 2008, the entire disclosures of which are incorporated by reference as a part of this application.

TECHNICAL FIELD

The present invention relates to a method of performing uplink scheduling. More particularly, the present invention relates to a method of performing uplink scheduling including uplink power control so as to reduce interference in an orthogonal frequency multiplex division access (OFMDA) system.

This work was supported by the IT R&D program of MIC/IITA [2007-P10-03, Development of WiBro Evolution Standards].

BACKGROUND ART

An orthogonal frequency division multiplex access (referred to as OFDMA or OFDM-FDMA) scheme is one of multiple access schemes. In the OFDMA scheme, a base station forms one service cell and allocates at least one of subcarriers, which are different from each other, to at least one mobile station included in the service cell. Accordingly, the OFDMA communication system can minimize interference in the cell.

In the OFDMA scheme, the mobile station transmits signals in uplink with restricted power. Therefore, when the mobile station is located at the edge of a cell, the mobile station cannot transmit packets in uplink because of a lack of sufficient power. For this reason, in order for the base station to properly receive packets from the mobile station located in the service cell, it is necessary to restrict interference generated from an adjacent cell to be less than a specific level.

In a mobile communication system of a general OFDMA scheme, when the mobile station is located in a cell, path loss between the mobile station and the service cell is smaller than that between the mobile station and an adjacent cell. In this case, the mobile station experiences little restriction on transmission power and transmits packets using comparatively high power in the uplink.

However, when the mobile station is located at the edge of a cell, since the mobile station is close to an adjacent cell, interference by the adjacent cell due to the transmission power of the mobile station can occur. Therefore, the mobile station reduces the amount of uplink interference power that interacts with the adjacent cell by restricting the transmission power, and transmits the packets by using a comparatively low power in the uplink. However, the mobile station requires recognition of an interference situation of the adjacent cell so as to control the transmission power.

Thus, according to the mobile communication system of the general OFDMA scheme, the interference influence of the cell is divided into three stages, and the base station broadcasts the interference stage of the service cell into the stage of a mobile station located in the service cell and an adjacent cell with a very low encoding rate over a specific broadcasting channel (OSICH). The mobile station receives the interference stage of the adjacent cell through the specified broadcasting channel (OSICH), and controls the transmission power in consideration of the interference stage of the adjacent cell.

As described above, according to the mobile communication system of the general OFDMA scheme, the base station transmits the interference stage of the service cell with a 2 bit OSI value such that the mobile station can control the transmission power according to the interference stage of the adjacent cell. For this reason, since only some mobile stations are capable of receiving the OSI value and can recognize the interference stage of the adjacent cell, it is difficult for the control of transmission power to be commonly applied to all mobile stations that bring about the interference of the adjacent cell. In addition, the mobile station should periodically receive the OSI value corresponding to the interference stage of the adjacent cell from the base station of the adjacent cell so as to recognize the interference stage of the adjacent cell.

Since the base station utilizes one OFDM (orthogonal frequency division multiplex) symbol so as to transmit the 2 bit OSI value corresponding to the interference of the service cell, radio resources can be unnecessarily wasted.

Moreover, the mobile station sets the transmission power in consideration of the interference stage of the adjacent cell and sets the transmission power by using a power control report message. In order to inform the base station of the set transmission power, the mobile station should carry out processes such as, for example, an uplink band request for the transmission power report message, band allocation through a control channel, and transmission of the power control report message. Accordingly, the mobile station cannot quickly report the transmission power to the base station. When the base station is not able to receive the power control report message from the mobile station, the base station carries out uplink scheduling by using incorrect information. Accordingly, there is a problem in that the reception success rate of an uplink traffic burst is decreased.

The above information disclosed in this Background section is only for enhancement of understanding of the background of the invention and therefore it may contain information that does not form the prior art that is already known in this country to a person of ordinary skill in the art.

DETAILED DESCRIPTION

Technical Problem

The present invention has been made in an effort to provide a method of performing uplink scheduling, which controls transmission power of a mobile station, in a base station, so as to reduce interference influence of an adjacent cell.

Technical Solution

An exemplary embodiment of the present invention provides a method of performing uplink scheduling of a mobile station in a base station, the mobile station being located in a service cell of the base station. In the method, at least one adjacent cell influenced by power of the mobile station exists, and the uplink includes a plurality of frequency bands that are different from one another. The method of performing the uplink scheduling includes: receiving interference amounts of the plurality of frequency bands corresponding to the at least one adjacent cell, respectively; calculating a plurality of interference values each corresponding to the plurality of frequency bands by using the plurality of interference amounts corresponding to the at least one adjacent cell, respectively; obtaining scheduling control information corresponding to the mobile station by using the plurality of interference values; and transmitting the scheduling control information to the mobile station.

The plurality of frequency bands may include: a first frequency band that is commonly used in all of cells; a second frequency band that is commonly used in the service cell and the at least one adjacent cell and is allocated to a mobile station located at an edge of the service cell; and a third frequency band that is commonly used in the service cell and the at least one adjacent cell and is allocated to a mobile station located at an edge of the adjacent cell.

The calculating of the plurality of interference values may include: receiving a path gain corresponding to the service cell from the mobile station; receiving path gains corresponding to the at least one adjacent cell from the mobile station, respectively; recognizing a difference in at least one path gain each corresponding to the at least one adjacent cell by using the path gain corresponding to the service cell and the path gains each corresponding to at least one adjacent cell; and calculating the plurality of interference values by using the difference in the plurality of interference amounts and the path gain each corresponding to the at least one adjacent cell.

The obtaining of the scheduling control information corresponding to the mobile station may include: calculating a plurality of transmission powers each corresponding to the plurality of frequency bands by using the plurality of interference values; calculating a plurality of signal to interference and noise ratios corresponding to the plurality of frequency bands by using the plurality of transmission powers; searching one frequency band corresponding to a maximum signal to interference and noise ratio among the plurality of frequency bands; recognizing a modulation and coding scheme control level corresponding to the maximum signal to interference and noise ratio; and generating scheduling control information including information on the one frequency band, a bandwidth corresponding to the one frequency band, and the modulation and coding scheme control level.

The obtaining of the scheduling control information corresponding to the mobile station may include: generating a plurality of signal to interference and noise ratios each corresponding to the plurality of frequency bands by using the plurality of interference values; calculating a plurality of transmission power densities each corresponding to the plurality of frequency bands by using the plurality of signal to interference and noise ratios; calculating a plurality of bandwidths each corresponding to the plurality of frequency bands by using the plurality of transmission power densities; searching one frequency band corresponding to a maximum bandwidth among the plurality of frequency bands; recognizing a modulation and coding scheme control level corresponding to a signal to interference and noise ratio of the one frequency band; and generating scheduling control information including information on the one frequency band, the maximum bandwidth, and the modulation and coding scheme control level. Here, the signal to interference and noise ratio may correspond to signals that are capable of being received from the mobile station.

Another embodiment of the present invention provides a method of performing uplink scheduling of a mobile station in a base station, the mobile station being located in a service cell of the base station. In the method, at least one of adjacent cells that are influenced by power of the mobile station exists, and the uplink includes a plurality of frequency bands that are different from one another. The method of performing the uplink scheduling includes: receiving interference amounts of the plurality of frequency bands corresponding to the at least one adjacent cell, respectively; calculating a plurality of interference values each corresponding to the plurality of frequency bands by using the plurality of interference amounts each corresponding to the at least one adjacent cell; calculating a plurality of transmission powers corresponding to the plurality of frequency bands by using the plurality of interference values; generating scheduling control information corresponding to the mobile station by using the plurality of transmission powers; and transmitting the scheduling control information to the mobile station.

The plurality of frequency bands may include: a first frequency band that is commonly used in all of cells; a second frequency band that is commonly used in the service cell and the at least one adjacent cell and is allocated to a mobile station located at an edge of the service cell; and a third frequency band that is commonly used in the service cell and the at least one adjacent cell and is allocated to a mobile station located at an edge of the adjacent cell.

The calculating of the plurality of transmission powers may include: in correspondence with the plurality of frequency bands, respectively, setting a power correction value of the related frequency band as a rising value when an interference value of the related frequency band is less than a first reference value, setting a power correction value of the related frequency band as a falling value when an interference value of the related frequency band is larger than a second reference value that is larger than the first reference value, and setting a power correction value of the related frequency band as a basic value when an interference value of the related frequency band is in the range of between the first reference value and the second reference value; and calculating the plurality of transmission powers by using a plurality of power correction values each corresponding to the plurality of frequency bands, respectively.

The generating of the scheduling control information may include: calculating a plurality of signal to interference and noise ratios each corresponding to the plurality of frequency bands by using the plurality of transmission powers; selecting one frequency band among the plurality of frequency bands by using the plurality of signal to interference and noise ratios; recognizing a bandwidth corresponding to the one frequency band; selecting a modulation and coding scheme control level corresponding to a signal to interference and noise ratio of the one frequency band; and generating scheduling control information including information on the one frequency band, the bandwidth, and the modulation and coding scheme control level.

The calculating of the plurality of signal to interference and noise ratios may include: measuring a plurality of interference levels each corresponding to the plurality of frequency bands in the service cell, respectively; and calculating the plurality of signal to interference and noise ratios by using a path gain corresponding to the service cell, the plurality of interference levels, and the plurality of transmission powers, respectively.

The selecting of the one frequency band may include: searching a maximum value among a signal to interference and noise ratio of the first frequency band, a signal to interference and noise ratio of the second frequency band multiplied by a predetermined weight value, and a signal to interference and noise ratio of the third frequency band; and selecting one frequency band corresponding to the maximum value. At this time, the predetermined weight value may be below 1.

Yet another embodiment of the present invention provides a method of performing uplink scheduling of a mobile station in a base station, the mobile station being located in a service cell of the base station. In the method, the uplink includes a plurality of frequency bands that are different from one another. The method of performing the uplink scheduling includes: receiving a plurality of interference amounts each corresponding to the plurality of frequency bands in at least one adjacent cell corresponding to the mobile station from the base station of the at least one adjacent cell, respectively; recognizing a plurality of interference values each corresponding to the plurality of frequency bands by using the plurality of interference amounts each corresponding to the at least one adjacent cell; generating a plurality of signal to noise and interference ratios each corresponding to the plurality of frequency bands by using the plurality of interference values; generating scheduling control information corresponding to the mobile station by using the plurality of signal to noise and interference ratios; and transmitting the scheduling control information to the mobile station. Here, the signal to interference and noise ratio is a factor with respect to signals that are capable of being received from the mobile station.

The plurality of frequency bands may include: a first frequency band that is commonly used in all of cells; a second frequency band that is commonly used in the service cell and the at least one adjacent cell and is allocated to a mobile station located at an edge of the service cell; and a third frequency band that is commonly used in the service cell and the at least one adjacent cell and is allocated to a mobile station located at an edge of the adjacent cell.

The generating of the plurality of signal to noise and interference ratios may include: in correspondence with the plurality of frequency bands, respectively, setting a correction value of the related frequency band as a rising value when an interference value of the related frequency band is less than a first reference value, setting a correction value of the related frequency band as a falling value when an interference value of the related frequency band is larger than a second reference value that is larger than the first reference value, and setting a correction value of the related frequency band as a basic value when an interference value of the related frequency band is in the range of between the first reference value and the second reference value; and generating the plurality of signal to interference and noise ratios by using a plurality of correction values each corresponding to the plurality of frequency bands.

The generating of the scheduling control information may include: calculating a plurality of transmission power densities each corresponding to the plurality of frequency bands by using the plurality of signal to interference and noise ratios; calculating a plurality of bandwidths each corresponding to the plurality of frequency bands by using the plurality of transmission power densities; selecting one frequency band among the plurality of frequency bands by the plurality of bandwidths; selecting a modulation and coding scheme control level by using a signal to interference and noise ratio of the one frequency band; and generating scheduling control information including information on the one frequency band, a bandwidth corresponding to the one frequency band, and the modulation and coding scheme control level.

The calculating of the plurality of transmission power densities may include: measuring a plurality of interference levels each corresponding to the plurality of frequency bands in the service cell, respectively; and calculating the plurality of transmission power densities by using a path gain corresponding to the service cell, the plurality of interference levels, and the plurality of signal to interference and noise ratios, respectively. The selecting of the one frequency band may include: selecting a maximum value among a bandwidth of the first frequency band, a bandwidth of the second frequency band multiplied by a predetermined weight value, and a bandwidth of the third frequency band; and selecting one frequency band corresponding to the maximum bandwidth. At this time, the predetermined weight value is below 1.

Advantageous Effects

According to the present invention, it can be possible to improve uplink transmission efficiency of the adjacent cell by reducing the interference influence due to the transmission power of the mobile station and improve transmission efficiency of the mobile station located on the cell edge.

BEST MODE

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout a specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

In this specification, a mobile station (MS) may designate a terminal, a mobile terminal (MT), a subscriber station (SS), a portable subscriber station (PSS), user equipment (UE), an access terminal (AT), and so on. Moreover, the mobile station may include all or a part of functions of the terminal, the mobile terminal, the subscriber station, the portable subscriber station, the user equipment, and so on.

Furthermore, in this specification, a base station (BS) may designate an access point (AP), a radio access station (RAS), a node B, an ENB (evolved node B), a base transceiver station (BTS), a mobile multihop relay (MMR)-BS and so on. Moreover, the base station may include all or a part of functions of the access point, the radio access station, the node B, the base transceiver station, the MMR-BS, and so on.

Hereinafter, a method of performing uplink scheduling according to an exemplary embodiment of the present invention will be described with reference to the accompanying drawings.

Figure 1:
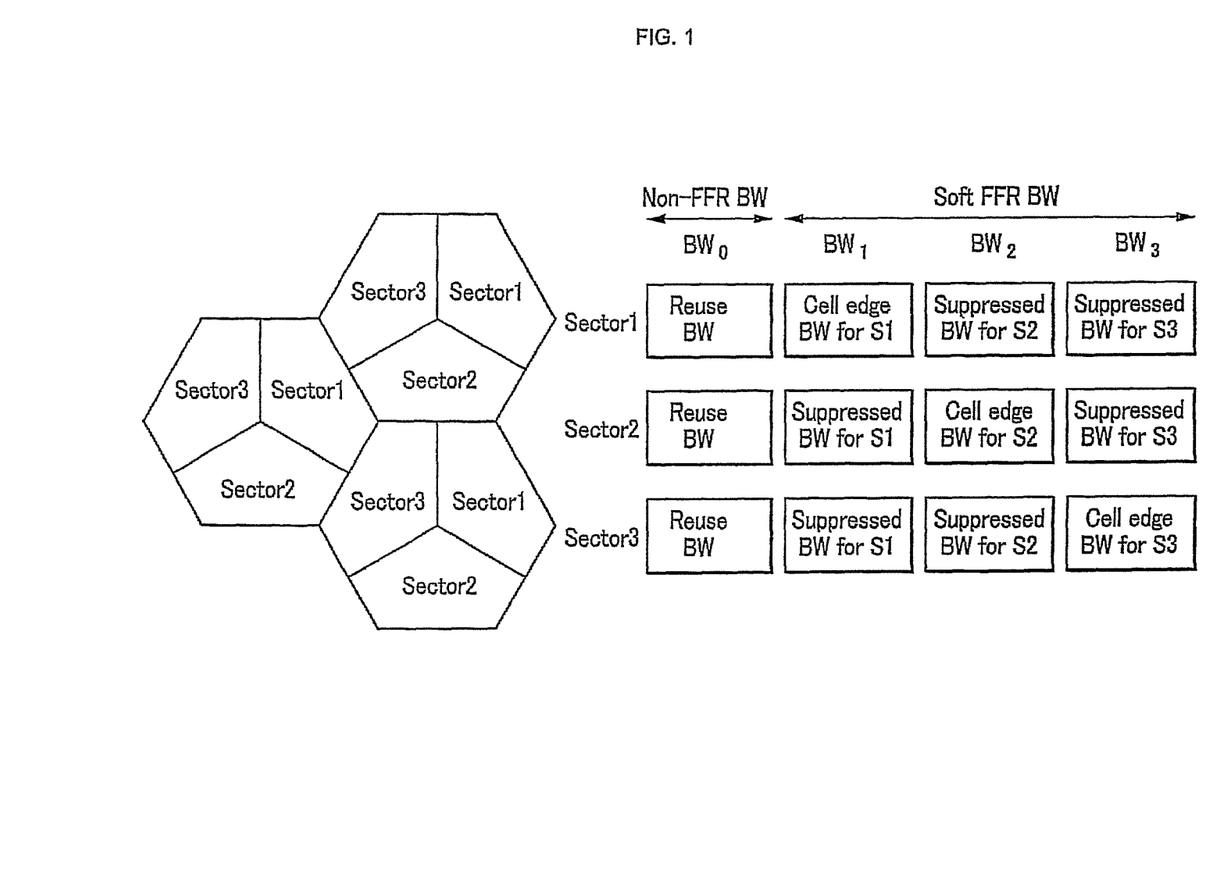
FIG. 1 is a view schematically illustrating cells according to an exemplary embodiment of the present invention.

FIG. 1 is a view schematically illustrating cells according to the exemplary embodiment of the present invention.

FIG. 1 illustrates three cells corresponding to three base stations. Here, each of three cells may include a plurality of sectors (shown as "Sector1", "Sector2", and "Sector3" in FIG. 1) by using a plurality of sector antennas. In FIG. 1, one cell includes three sectors, but one cell may include one or more sectors. Furthermore, since sectors in the cell are used as one cell, the cell represents a sector or cell, hereinafter. In addition, hereinafter, a cell where the mobile station is located is designated as a service cell, and a cell adjacent to the service cell is designated as an adjacent cell.

Meanwhile, an uplink of a system to be operated in one cell may be classified into a plurality of frequency bands according to a service. Here, the plurality of frequency bands includes a reuse frequency band (RBW, hereinafter referred to as an "RBW"), a cell edge frequency band (EBW, hereinafter referred to as an "EBW"), and a suppressed frequency band (SBW, hereinafter referred to as an "SBW").

The RBW represents a general frequency band for applying a frequency reuse factor (FFR, hereinafter referred to as an "FFR") of 1. Here, the FFR represents the number of frequencies to be reused in the cell. That is, in order to reduce interference applied to an adjacent cell due to the power of the mobile station, the power of the mobile station is determined by a control of interference over thermal noise (loT, hereinafter referred to as "amount of interference") in the RBW.

The EBW represents a frequency band for applying a soft fractional frequency reuse (soft FFR, hereinafter referred to as a "soft FFR"). That is, the EBW is a frequency band that the service cell and the adjacent cell commonly used, and the EBW is a frequency band for controlling the power of the mobile station so as to ensure the interference of the adjacent cell to below a predetermined reference by the power of the mobile station that is located at an edge of the service cell.

The SBW represents a frequency band that applies the Soft FFR in the service cell and is used as the EBW in the adjacent cell. That is, it is possible to set the power of the mobile station to zero so as to minimize the interference of the adjacent cell due to the power of the mobile station in the SBW.

As shown in FIG. 1, a frequency band $BW_0$ is a frequency band ("non-FFR BW" in FIG. 1) to which the FFR is not applied, and the frequency band BM is used as RBW in sector 1, sector 2, and sector 3, respectively. In addition, frequency bands $BW_1$, $BW_2$, and $BW_3$ are frequency bands ("Soft FFR BW" in FIG. 1) to which the Soft FFR is applied. That is, the frequency band $BW_1$ is used as the EBW in sector 1 and is used as the SBW in sector 2 and sector 3. The frequency band $BW_2$ is used as the EBW in sector 2 and is used as the SBW in sector 1 and sector 3. Furthermore, the frequency band $BW_3$ is used as the EBW in sector 3 and is used as the SBW in sector 1 and sector 2.

Meanwhile, FIG. 1 also illustrates three frequency bands to which the soft FFR is applied. However, when the reuse factor is 7, it is possible to set seven frequency bands to which the soft FFR is applied.

As described above, uplink resources include a plurality of frequency bands. According to the exemplary embodiment of the present invention, the base station controls the power of the plurality of frequency bands, thereby searching scheduling control information to be suitable to the mobile station.

Hereinafter, a method of controlling uplink power according to an exemplary embodiment of the present invention will be described. According to the exemplary embodiment of the present invention, by assuming that the base station of the service cell has at least one of adjacent cells corresponding to the service cell, the base station controls the power of the terminal in consideration of an interference amount of at least one adjacent cell.

Figure 2:
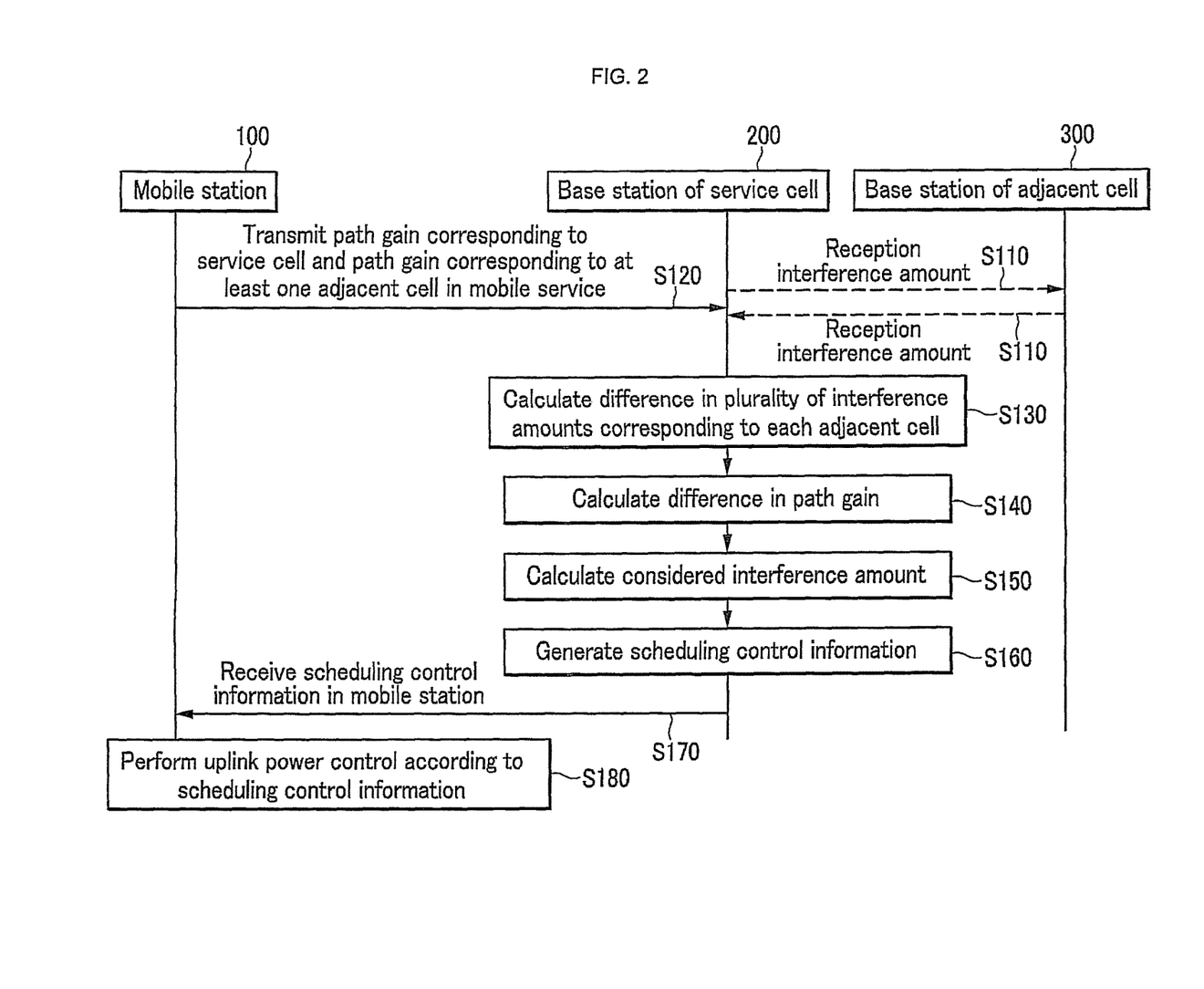
FIG. 2 is a flowchart illustrating a method of controlling uplink power according to an exemplary embodiment of the present invention.

FIG. 2 is a flowchart illustrating a method of controlling uplink power according to an exemplary embodiment of the present invention.

As shown in FIG. 2, a plurality of base stations 200 and 300 forming cells periodically inform each other of their interference amount ("reception interference amount" in FIG. 2) through a backbone network (indicated as a dotted line in FIG. 2) (S110). That is, the base station 200 of the service cell receives a plurality of interference amounts corresponding to a plurality of frequency bands from each base station 300 of at least one adjacent cell. That is, one of the plurality of base stations 200 and 300 transmits a plurality of interference amounts, which includes the interference amount in the RBW, the interference amount in the EBW, and the interference amount in the SBW, to the other base station.

The mobile station 100 located in the service cell transmits a path gain associated with the base station 200 of the service cell and a path gain associated with at least one adjacent cell to the base station 200 by periods or according to the request of the base station (S120). Here, the base station 200 of the service cell can receive the interference amount of the adjacent cell after receiving the path gain.

When receiving uplink request information from the mobile station 100, the base station 200 calculates a difference in the plurality of interference amounts corresponding to at least one adjacent cell (S130). That is, the base station 200 calculates $\Delta IoT_{RBW,j}$, $\Delta IoT_{EBW,j}$, and $\Delta IoT_{SBW,j}$ corresponding to at least one adjacent cell(j), respectively.

Equation 1 is a formula for calculating the difference in the interference amounts.

$$\Delta IoT_{x,j} = IoT_{x,j}/IoT_{x,target} \quad \text{(Equation 1)}$$

In Equation 1, the $IoT_{x,j}$ represents the interference amount corresponding to the frequency band x in the adjacent cell j, and the $IoT_{x,target}$ represents a reference interference amount corresponding to the frequency band x. In addition, the $\Delta IoT_{x,j}$ indicates the difference in the interference amounts corresponding to the frequency band x in the adjacent cell j. Here, the reference interference amount indicates a target value that is necessary to control the interference amount. The reference interference amount may be set to a value that varies in each frequency band. For example, since the SBW is a band to be used as the EBW in the adjacent cell, the interference amount corresponding to the SBW may be set to a low value so as to show the adjacent cell having a low interference amount in the related band. On the contrary, since the EBW is a band to be used as the SBW in the adjacent cell, the interference amount corresponding to the EBW may be set to a high value so as to ensure the service of the service cell in the related band.

As indicated in Equation 1, the difference $\Delta IoT_{x,j}$ of the interference amount may be obtained by the difference between the reference interference amount $IoT_{x,target}$ and the interference amount $IoT_{x,j}$. That is, when the difference $\Delta IoT_{x,j}$ of the interference amount is larger than 1, it implies that the interference amount corresponding to frequency band x in the adjacent cell j is larger than the reference interference amount. Further, when the difference $\Delta IoT_{x,j}$ of the interference amount is smaller than 1, it implies that the interference amount corresponding to frequency band x in the adjacent cell j is smaller than the reference interference amount.

Meanwhile, when the unit of the reference interference amount $IoT_{x,target}$ and the interference amount $IoT_{x,j}$ is dB, the difference $\Delta IoT_{x,j}$ of the interference amount may be obtained by the difference between the reference interference amount $IoT_{x,target}$ and the interference amount $IoT_{x,j}$.

The base station 200 receives the path gain between the mobile station 100 and the service cell and the path gain between the mobile station 100 and each at least one adjacent cell from the mobile station 200, thereby calculating the difference in at least one path gain each corresponding to at least one adjacent cell (S140). The following Equation 2 is a formula for calculating the difference in a path gain.

$$\Delta PG_{i,j} = PG_j / PG_i \, [dB] \quad \text{(Equation 2)}$$

In Equation 2, the $PG_i$ represents a path gain between the mobile station 100 and the service cell i, the $PG_j$ represents a path gain between the mobile station 100 and the adjacent cell j, and the $\Delta PG_{i,j}$ represents the difference in a path gain of the service cell i and the adjacent cell j. At this time, the path gains $PG_i$ and $PG_j$ each corresponding to the service cell i or at least one adjacent cell j are to indicate an average path loss on the mobile station, and include shadow fading. Moreover, the path gains $PG_i$ and $PG_j$ are to indicate an average channel loss on the frequency band or time. Thus, the base station applies a value (hereinafter referred to as "average path gain") that takes an average of the path gain PG; between the mobile station and the service cell (i) during a predetermined time to Equation 2, and can thereby allow the difference in the path gain to not be sensitively varied by high fading.

Next, the base station 200 calculates a plurality of considered interference amounts (hereinafter also referred to as "interference values"), that are necessary for the power control of the related mobile station, by using the difference in the plurality of interference amounts and the difference in the path gain each corresponding to at least one adjacent cell (S150). Here, the plurality of considered interference amounts correspond to a plurality of frequency bands, respectively. That is, the base station 200 calculates a considered interference amount corresponding to the RBW, a considered interference amount corresponding to the EBW, and a considered interference amount corresponding to the SBW, respectively.

The following Equation 3 is a formula for calculating the considered interference amount.

$$\Delta IoT_x = \sum_{j \neq i} W_{x,j} \times \Delta PG_{i,j} \times \Delta IoT_{x,j} \quad \text{(Equation 3)}$$
$$= \sum_{j \neq i} \frac{W_{x,j} \times PG_j \times IoT_{x,j}}{PG_i \times IoT_{x,target}}$$

In Equation 3, $\Delta IoT_x$ represents the considered interference amount corresponding to the frequency band x. As indicated in Equation 3, the considered interference amount $\Delta IoT_x$ can be obtained by the sum of at least one $W_{x,j} \times \Delta PG_{i,j} \times \Delta IoT_{x,j}$ each corresponding to at least one adjacent cell. Here, the $W_{x,j}$ represents weight value corresponding to the adjacent cell j in the frequency band x. That is, the weight value $W_{x,j}$ is set according to each characteristic of the plurality of frequency bands or each characteristic of at least one adjacent cell.

A weight value $W_{RBWj}$ each corresponding to at least one adjacent cell j in the RBW is as indicated in the following Equation 4.

$$W_{RBWj} = W_{normal} \quad \text{(Equation 4)}$$

As indicated in Equation 4, the weight value corresponding to the RBW is set to the same parameter $W_{normal}$ regardless of the adjacent cell. Here, the parameter $W_{normal}$ is determined by the following Equation 5.

$$W_{normal}(l) = W_{normal}(l-1) + \Delta W_{normal} \quad \text{(Equation 5)}$$

As indicated in Equation 5, a currently updating parameter $W_{normal}(l)$ can be expressed by the sum of a previously used parameter $W_{normal}(l-1)$ and a $\Delta W_{normal}$.

Here, the $\Delta W_{normal}$ is as indicated in the following Equation 6.

$$\Delta W_{normal} = \begin{cases} \Delta W & \sum_t \sum_j \Delta IoT_{RBW,j}(t) \geq 0[dB] \\ -\Delta W & \sum_t \sum_j \Delta IoT_{RBW,j}(t) < 0[dB] \end{cases} \quad \text{(Equation 6)}$$

As indicated in Equation 6, the $\Delta W_{normal}$ is determined by a first resulting value that is a sum of the difference in the interference amounts, each of which corresponds to at least one adjacent cell in the RBW, during a predetermined time t. At this time, when the first resulting value is not less than a basic value (represented as "0" in Equation 6), the $\Delta W_{normal}$ is determined as a rising value $\Delta W$, and thereby the parameter $W_{normal}$ rises. Further, when the first resulting value is less than the basic value 0, the $\Delta W_{normal}$ is determined as a falling value $-\Delta W$, thereby the parameter $W_{normal}$ falls.

Next, a weight value $W_{EBWj}$, corresponds to at least one adjacent cell j in the EBW, respectively, is as indicated in the following Equation 7.

$$W_{EBWj} = W_{small} \quad \text{(Equation 7)}$$

As indicated in Equation 7, the weight value corresponding to the EBW is set to the same parameter $W_{small}$ regardless of the adjacent cell. Here, the parameter $W_{small}$ is smaller than the parameter $W_{normal}$. Therefore, the weight value $W_{EBWj}$ corresponding to the EBW is set to a smaller value than the weight value $W_{RBWj}$ corresponding to the RBW so as to not be sensitive to the interference amount of the adjacent cell in the EBW. The parameter $W_{small}$ is as indicated in the following Equation 8.

$$W_{small}(l) = W_{small}(l-1) + \Delta W_{small} \quad \text{(Equation 8)}$$

As indicated in Equation 8, a currently updating parameter small $W_{small}(l)$ can be expressed by the sum of a previously used parameter $W_{small}(l-1)$ and a $\Delta W_{small}$.

Here, the $\Delta W_{small}$ is as indicated in the following Equation 9.

$$\Delta W_{small} = \begin{cases} \Delta W & \sum_t \sum_j \Delta IoT_{EBW,j}(t) \geq 0[dB] \\ -\Delta W & \sum_t \sum_j \Delta IoT_{EBW,j}(t) < 0[dB] \end{cases} \quad \text{(Equation 9)}$$

As indicated in Equation 9, the $\Delta W_{small}$ is determined by a second resulting value that is the sum of the difference in the interference amounts, each of which corresponds to at least one adjacent cell in the EBW, during a predetermined time (t). That is, when the second resulting value is not less is than a basic value (represented as "0" in Equation 9), the $\Delta W_{small}$ is determined as a rising value $\Delta W$, and thereby the parameter $W_{small}$ rises. Further, when the second resulting value is less than the basic value 0, the $\Delta W_{small}$ is determined as a falling value $-\Delta W$, and thereby the parameter $W_{small}$ falls.

Next, a weight value $W_{SBW,j}$ corresponding to a portion of at least one adjacent cell, which uses the related frequency band as the EBW, in the SBW, is as indicated in the following Equation 10.

$$W_{SBW,j} = W_{large} \qquad \text{(Equation 10)}$$

As indicated in Equation 10, when the service cell uses the related frequency band as the SBW and when any adjacent cell uses the related frequency band as the EBW, the weight value $W_{SBW,j}$ corresponding to the SBW is set to a parameter $W_{large}$ that is larger than a parameter $W_{normal}$ so as to set the weight value of any adjacent cell to be high.

Meanwhile, a weight value $W_{SBW,j}$ corresponding to the rest of at the least one adjacent cell, which does not use the related frequency band as the EBW, in the SBW, is as indicated in the following Equation 11.

$$W_{SBW,j} = W_{normal} \qquad \text{(Equation 11)}$$

As indicated in Equation 11, when the service cell uses the related frequency band as the SBW and when any adjacent cell does not use the related frequency band as the EBW, it is not necessary to set the weight value of any adjacent cell to be high. Accordingly, the weight value $W_{SBW,j}$ corresponding to the SBW is set to the parameter $W_{normal}$ like the weight value $W_{RBW,j}$ corresponding to the RBW.

Meanwhile, the parameter $W_{large}$ is i as indicated in the following Equation 12.

$$W_{large}(l) = W_{large}(l-1) + \Delta W_{large} \qquad \text{(Equation 12)}$$

As indicated in Equation 12, a currently updating parameter $W_{large}(l)$ can be expressed by the sum of a previously used parameter $W_{large}(l-1)$ and $\Delta W_{large}$.

Here, the $\Delta W_{large}$ is as indicated in the following Equation 13.

$$\Delta W_{large} = \begin{cases} \Delta W & \sum_t \sum_j \Delta IoT_{SBW,j}(t) \geq 0 [dB] \\ -\Delta W & \sum_t \sum_j \Delta IoT_{SBW,j}(t) < 0 [dB] \end{cases} \qquad \text{(Equation 13)}$$

As indicated in Equation 13, $\Delta W_{large}$ is determined by a third resulting value is a sum of the difference in the interference amounts, each of which corresponds to at least one adjacent cell in the SBW, during a predetermined time t. That is, when the third resulting value is not less than a basic value (represented as "0" in Equation 13), the $\Delta W_{large}$ is determined as a rising value $\Delta W$, and thereby the parameter $W_{large}$ rises. Further, when the third resulting value is less than the basic value 0, the $\Delta W_{large}$ is determined as a falling value $-\Delta W$, and thereby the parameter $W_{large}$ falls.

FIG. 2 will now be described.

As shown in FIG. 2, the base station 200 generates scheduling control information corresponding to the mobile station 100 by using the plurality of considered interference amounts (S160). Furthermore, the base station 200 transmits the scheduling control information to the mobile station 100 (S170). A method of generating the scheduling control information in the base station 200 will now be described in detail.

The mobile station 100 receives the scheduling control information from the base station to control the power of an uplink transmission signal by using the scheduling control information (S180).

As described above, according to the exemplary embodiment of the present invention, the base station 200 receives the plurality of interference amounts each corresponding to the plurality of frequency bands from the base station 300 of at least one adjacent cell, respectively. Moreover, the base station 200 generates the scheduling control information of the mobile station 100 by using the path gain transmitted from the mobile station 100 and the plurality of interference amounts each corresponding to at least one adjacent cell.

A method of generating the scheduling control information according to a first exemplary embodiment of the present invention will now be described.

Figure 3:
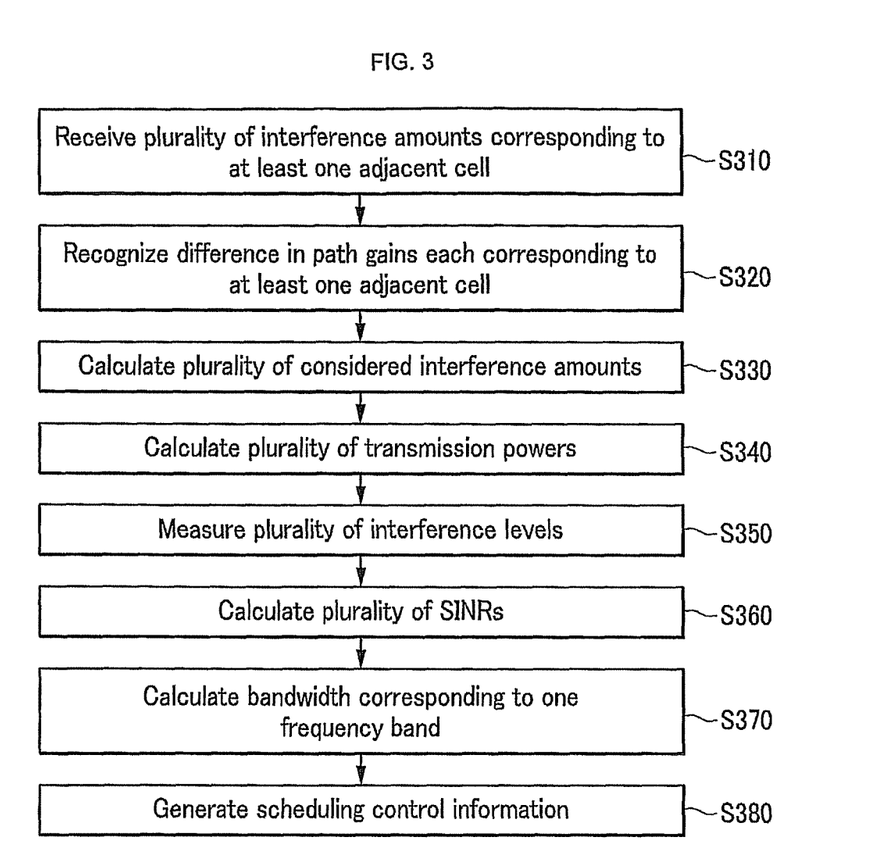
FIG. 3 is a flowchart illustrating a method of allocating modulation, coding schedule, and radio resources to a mobile station according to a first exemplary embodiment of the present invention.

FIG. 3 is a flowchart illustrating the method of generating the scheduling control information according to the first exemplary embodiment of the present invention.

As shown in FIG. 3, the base station 200 receives the plurality of interference amounts each corresponding to the plurality of frequency bands from the base station 300 of at least one adjacent cell (S310). In addition, the base station 200 recognizes the difference $\Delta PG_{i,j}$ in at least one path gain each corresponding to the base station of at least one adjacent cell by using Equation 2 (S320).

The base station 200 calculates a plurality of considered interference amounts each corresponding to a plurality of frequency bands through the plurality of interference amounts and the difference in the path gain each corresponding to at least one adjacent cell by using Equation 3 (S330).

According to the first exemplary embodiment of the present invention, the base station 200 calculates a plurality of transmission powers each corresponding to the plurality of frequency bands at the current time (S340). That is, the base station 200 determines a transmission power corresponding to the RBW, a transmission power corresponding to the EBW, and a transmission power corresponding to the SBW at the current time, respectively.

The following Equation 14 is a formula for obtaining the transmission power at the current time.

$$P_x(t) = P_x t-1 + \Delta P_x [dB] \qquad \text{(Equation 14)}$$

In Equation 14, the $P_x(t)$ represents the transmission power corresponding to the frequency band(x) at the current time t, the $P_x(t-1)$ represents the transmission power corresponding to the frequency band(x) at the previous time t−1, and the $\Delta P_x$ represents a power correction value corresponding to the frequency band x.

Equation 15 is a formula for obtaining the power correction value $\Delta P_x$.

$$\Delta P_x = \begin{cases} \Delta P_{up} & \Delta IoT_x \leq \Delta IoT_{lower} \\ \Delta P_{down} & \Delta IoT_x \geq \Delta IoT_{upper} \\ 0 & \Delta IoT_{lower} < \Delta IoT_x < \Delta IoT_{upper} \end{cases} \qquad \text{(Equation 15)}$$

As indicated in Equation 15, the power correction value $\Delta P_x$ corresponding to the frequency band x is determined by the considered interference amount $\Delta IoT_x$ corresponding to the frequency band x. That is, when the considered interference amount $\Delta IoT_x$ is not more than the $\Delta IoT_{lower}$, the power correction value $\Delta P_x$ is determined as a rising value $\Delta P_{up}$. Further, when the considered interference amount $\Delta IoT_x$ is not less than the $\Delta IoT_{upper}$, the power correction value $\Delta P_x$ is determined as a falling value $\Delta P_{down}$. In addition, when the considered interference amount $\Delta IoT_x$ is in the range between the $\Delta IoT_{lower}$ and the $\Delta IoT_{upper}$, the power correction value $\Delta P_x$ is determined as a basic value (represented as "0" in Equation 15).

Next, as shown in FIG. 3, the base station 200 measures interference levels of the service cell in the plurality of frequency bands, respectively (S350). Furthermore, the base station 200 calculates a plurality of SINRs (hereinafter also referred to as "signal to interference-plus-noise ratio") corresponding to the plurality of frequency bands by using the plurality of interference levels and the plurality of transmission powers corresponding to the plurality of frequency bands (S360).

The following Equation 16 is a formula for obtaining the SINR.

$$SINR_x = \frac{P_x G_i}{NI_x} \quad \text{(Equation 16)}$$

In Equation 16, $SINR_x$ represents a SINR corresponding to the frequency band x, and $NI_x$ represents an interference level of the service cell in the frequency band x. $P_x$ represents a transmission power corresponding to the frequency band x, and $G_i$ represents a path gain between the mobile station 100 and the base station 200 of the service cell. In this case, the base station 200 applies the latest path gain $G_i$ to the path gain between the mobile station 100 and base station 200 of the service cell in Equation 16 such that a $SINR_x$ that is suitable for a current uplink channel can be calculated.

The base station 200 selects one frequency band applied to the mobile station 100 among a plurality of frequency bands through a plurality of SINRs using Equation 17.

$$X = \underset{x}{\arg\max}\{SINR_{RBW}, SINR_{SBW}, \lambda SINR_{EBW}\}, \lambda < 1 \quad \text{(Equation 17)}$$

As expressed in Equation 17, the base station 200 searches a maximum value among a SINR ($SINR_{RBW}$) corresponding to RBW, a SINR ($SINR_{SBW}$) corresponding to SBW, and a SINR ($\lambda SINR_{EBW}$) corresponding to EBW and multiplied by a weight value λ. When the SINR ($SINR_{EBW}$) corresponding to EBW is multiplied by the weight value λ, EBW can be prevented from being applied to most mobile stations. In addition, the weight value λ is less than 1, and thereby a ratio of EBW applied to a mobile station located at the edge of service cells in accordance with the weight value λ can be controlled.

The base station 200 selects the frequency band X corresponding to the maximum SINR as one frequency band that is applied to the mobile station 100.

The base station 200 selects a frequency band X using Equation 17 and recognizes a bandwidth corresponding to the frequency band X (S370). Here, a plurality of bandwidths each corresponding to a plurality of frequency bands are predetermined in accordance with the difference in interference amounts.

Equation 18 is a formula for determining a bandwidth corresponding to an arbitrary frequency band x at the current time.

$$L_x(l) = L_x(l-1) + \Delta L_x \quad \text{(Equation 18)}$$

As expressed in Equation 18, the bandwidth $L_x(l)$ corresponding to the frequency band x at the current time corresponds to the sum of $\Delta L_x$ and the bandwidth $L_x(l)$ corresponding to the frequency band x at the previous time. Here, $\Delta L_x$ is defined as indicated in Equation 19.

$$\Delta L_x = \begin{cases} -\Delta L_{step} & \sum_t \sum_j \Delta IoT_{x,j}(t) \geq 0[dB] \\ \Delta L_{step} & \sum_t \sum_j \Delta IoT_{x,j}(t) < 0[dB] \end{cases} \quad \text{(Equation 19)}$$

As indicated in Equation 19, $\Delta L_x$ is determined by a value that is a sum of the difference in interference amounts each corresponding to at least one adjacent cell in the frequency band x during a predetermined time t. That is, when the sum is not less than a basic value (represented as "0" in Equation 19), $\Delta L_x$ is determined as a falling value $-\Delta L_{step}$, thereby decreasing the bandwidth $L_x(l)$ at the current time in comparison with the bandwidth $L_x(l-1)$ at the previous time. When the sum is less than the basic value 0, $\Delta L_x$ is determined as a rising value $\Delta L_{step}$, thereby increasing the bandwidth $L_x(l)$ at the current time in comparison with the bandwidth $L_x(l-1)$ at the previous time.

Next, the base station 200 selects an MCS level corresponding to the frequency band X such that Equation 20 is satisfied, and generates scheduling control information including information on the bandwidth and MCS level (S380).

$$\frac{P_X G_i / N_{sub}}{NI_{0,X}} \geq SINR_X(m) \quad \text{(Equation 20)}$$

In Equation 20, $NI_{0,x}$ represents power density per subcarrier in the frequency band X, and $N_{sub}$ represents the number of subcarriers corresponding to a bandwidth ($L_x(l)$) of the frequency band X. $P_x$ represents transmission power corresponding to the frequency band X.

As described above, according to the first exemplary embodiment, the base station 200 calculates a plurality of transmission powers using a plurality of considered interference amounts, calculates a plurality of SINRs using a plurality of transmission powers, selects a maximum value among a plurality of SINRs, and selects the bandwidth and MCS level corresponding to the selected SINR. The base station 200 generates the scheduling control information including information of the frequency band corresponding to the maximum SINR, the transmission power of the selected frequency band, the bandwidth corresponding to the selected frequency band, and the MCS level corresponding to the maximum SINR. The scheduling control information is transmitted to the mobile station 100 through the downlink.

Next, a method of generating scheduling control information according to a second exemplary embodiment of the present invention is described.

Figure 4:
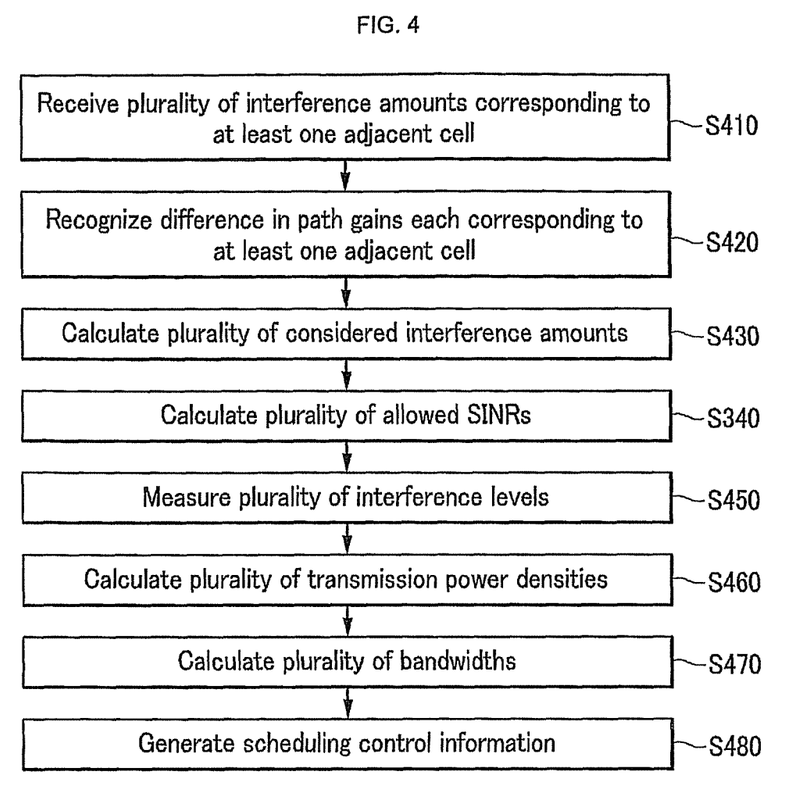
FIG. 4 is a flowchart illustrating a method of allocating modulation, coding schedule, and radio resources to a mobile station according to a second exemplary embodiment of the present invention.

FIG. 4 is a flowchart illustrating a method of generating scheduling control information according to a second exemplary embodiment of the present invention.

As shown in FIG. 4, according to the second exemplary embodiment, the base station 200 receives a plurality of interference amounts each corresponding to the plurality of frequency bands from the base station 300 of at least one adjacent cell (S410). The base station 200 recognizes a difference $\Delta PG_{i,j}$ in at least one path gain each corresponding to the base station of at least one adjacent cell using Equation 2 (S420).

Using Equation 3, the base station 200 calculates a plurality of interference amounts each corresponding to at least one adjacent cell, and a plurality of considered interference amounts corresponding to a plurality of frequency bands through the difference in path gain (S430).

According to the second exemplary embodiment, the base station 200 calculates a plurality of SINRs (hereinafter referred to as "allowed SINRs") that can be allowably received from the mobile station 100 by using a plurality of interference amounts each corresponding to at least one adjacent cell, respectively (S440). Here, the plurality of allowed SINRs corresponds to a plurality of frequency bands, respectively.

Equation 21 is a formula for calculating the allowed SINR.

$$\gamma_x(t) = \gamma_x(t-1) + \Delta\gamma_x \quad \text{(Equation 21)}$$

Equation 21, $\gamma_x(t)$ represents the allowed SINR corresponding to the frequency band x at a current time t, and $\gamma_x(t-1)$ represents the allowed SINR corresponding to the frequency band x at a previous time t-1. $\Delta\gamma_x$ represents an allowed SINR correction value.

The allowed SINR correction value $\Delta\gamma_x$ is expressed as below in Equation 22.

$$\Delta\gamma_x = \begin{cases} \Delta\gamma_{up} & \Delta IoT_x \le \Delta IoT_{lower} \\ \Delta\gamma_{down} & \Delta IoT_x \ge \Delta IoT_{upper} \\ 0 & \Delta IoT_{lower} < \Delta IoT_x < \Delta IoT_{upper} \end{cases} \quad \text{(Equation 22)}$$

As indicated in Equation 22, the allowed SINR correction value $\Delta\gamma_x$ corresponding to the frequency band x is determined in accordance with the considered interference amount $\Delta IaT_x$ corresponding to the frequency band x. That is, when the considered interference amount $\Delta IoT_x$ is not more than $\Delta IoT_{lower}$, the allowed SINR correction value $\Delta\gamma_x$ is determined as a rising value $\Delta\gamma_{up}$. When the considered interference amount $\Delta IoT_x$ is not less than $\Delta IoT_{upper}$, the allowed SINR correction value $\Delta\gamma_x$ is determined as a falling value $\Delta\gamma_{down}$. In addition, when the considered interference amount $\Delta IoT_x$ is in the range between $\Delta IoT_{lower}$ and $\Delta IoT_{upper}$, the allowed SINR correction value $\Delta\gamma_x$ is determined as a basic value (represented as "0" in Equation 22).

Next, as shown in FIG. 3, the base station 200 measures interference levels of the service cell in the plurality of frequency bands, respectively (S450). The base station 200 calculates a plurality of transmission power densities corresponding to a plurality of frequency bands, respectively.

Equation 23 is a formula for calculating the transmission power density.

$$P'_x = \frac{\gamma_x \times NI_x}{G_i} \quad \text{(Equation 23)}$$

In Equation 23, $P'_x$ represents the transmission power density corresponding to the frequency band x, and $NI_x$ represents the interference level of the service cell corresponding to the frequency band x. $\gamma_x$ represents the allowed SINR corresponding to the frequency band x determined by Equation 21, and $G_i$ represents the latest path gain between the mobile station and the base station i of the service cell. As described above, by using Equation 23, the base station 200 can obtain a transmission power density $P'_{RBW}$ corresponding to RBW, a transmission power density $P'_{EBW}$ corresponding to EBW, and a transmission power density $P'_{SBW}$ corresponding to EBW.

Using a plurality of power transmission densities, the base station 200 calculates bandwidths each corresponding to the plurality of frequency bands (S470).

Equation 24 is a formula for calculating the bandwidth.

$$BW'_x = \frac{P_{max}}{P'_x} \quad \text{(Equation 24)}$$

In Equation 24, $BW'_x$ represents the bandwidth corresponding to the frequency band x, $P_{max}$ represents the physical maximum transmission power in the mobile station 100, and $P'_x$ represents the transmission power density corresponding to the frequency band x. As indicated in Equation 24, the bandwidth $BW'_x$ can be obtained from a magnitude of the physical maximum transmission power $P_{max}$ in the mobile station 100 with respect to the transmission power density $P'_x$.

Next, the base station 200 selects one frequency band applied to the mobile station 100 among a plurality of frequency bands through a plurality of bandwidths.

$$X = \underset{x}{\operatorname{argmax}}\{BW'_{RBW}, BW'_{SBW}, \lambda BW'_{EBW}\}, \lambda < 1 \quad \text{(Equation 25)}$$

As indicated in Equation 25, the base station 200 searches a maximum value among the bandwidth $BW'_{RBW}$ corresponding to RBW, the bandwidth $BW'_{SBW}$ corresponding to SBW, and the bandwidth $BW'_{EBW}$ corresponding to EBW multiplied by a weight value $\lambda$. Here, the bandwidth $BW'_{EBW}$ corresponding to EBW is multiplied by the weight value $\lambda$ in order to prevent EBW from being applied to most mobile stations. In addition, the weight value $\lambda$ is set to be less than 1, and thereby a ratio of EBW applied to a mobile station located at the edge of service cells in accordance with the weight value $\lambda$ can be controlled.

The base station 200 selects the frequency band X corresponding to the maximum bandwidth as the frequency band that is applied to the mobile station 100.

Next, the base station 200 selects an MCS level corresponding to the frequency band X so as to satisfy the following Equation 26, and generates the scheduling control information including information on the bandwidth and MCS level (S480).

$$SINR_X(m) \le \frac{P_{max} G_i / N_{sub}}{NI_{0,X}} \le \gamma_X \quad \text{(Equation 26)}$$

In Equation 26, $NI_{0,x}$ represents power density per subcarrier in the frequency band X, and $N_{sub}$ represents a number of subcarriers corresponding to the bandwidth $BW'_x$ of the frequency band X. As expressed in Equation 26, the MCS level m corresponding to the allowed SINR ($SINR_X$) of one frequency band X is determined.

According to the second exemplary embodiment, the base station 200 calculates a plurality of allowed SINRs using a plurality of considered interference amounts, calculates a plurality of transmission power densities using a plurality of allowed SINRs, and calculates a plurality of bandwidths using a plurality of transmission power densities, respectively. Then, the base station 200 selects a maximum value among a plurality of bandwidths to select a frequency band corresponding to the selected bandwidth and MCS level corresponding to the allowed SINR. In addition, the base station 200 generates the scheduling control information including information on each of the selected bandwidth and MCS level, and transmits the scheduling control information to the mobile station 100 through the downlink.

As described above, according to exemplary embodiments of the present invention, since the base station controls power of a mobile station with respect to each of a plurality of frequency bands that perform different functions, the uplink scheduling in the mobile station can be performed such that the interference of adjacent cells is minimized.

The exemplary embodiment of the present invention can not only be implemented by the above-described apparatus and/or method, but can be implemented by, for example, a program that achieves the functions corresponding to the configuration of the exemplary embodiments of the present invention and a recording medium in which the program is recorded. This will be easily implemented from the above-described exemplary embodiments of the present invention by those skilled in the related art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of performing uplink scheduling of a mobile station in a base station, the mobile station being located in a service cell of the base station,
   wherein at least one adjacent cell influenced by power of the mobile station exists, and
   the method of performing the uplink scheduling comprises:
   receiving interference amounts of a plurality of frequency bands corresponding to the at least one adjacent cell, respectively;
   calculating a plurality of interference values each corresponding to the plurality of frequency bands by using the plurality of interference amounts corresponding to the at least one adjacent cell, respectively;
   obtaining scheduling control information corresponding to the mobile station by using the plurality of interference values; and
   transmitting the scheduling control information to the mobile station,
   wherein the uplink includes the plurality of frequency bands that are different from one another in that a first frequency band is commonly used in all of cells; a second frequency band is commonly used in the service cell and the at least one adjacent cell and is allocated to a mobile station located at an edge of the service cell; and a third frequency band that is commonly used in the service cell and the at least one adjacent cell and is allocated to a mobile station located at an edge of the adjacent cell.

2. The method of claim 1, wherein the calculating of the plurality of interference values comprises:
   receiving a path gain corresponding to the service cell from the mobile station;
   receiving path gains corresponding to the at least one adjacent cell from the mobile station, respectively;
   recognizing a difference in at least one path gain each corresponding to the at least one adjacent cell by using the path gain corresponding to the service cell and the path gains each corresponding to at least one adjacent cell; and
   calculating the plurality of interference values by using the difference in the plurality of interference amounts and the path gain each corresponding to the at least one adjacent cell.

3. The method of claim 1, wherein the obtaining of the scheduling control information corresponding to the mobile station comprises:
   calculating a plurality of transmission powers each corresponding to the plurality of frequency bands by using the plurality of interference values;
   calculating a plurality of signal to interference and noise ratios corresponding to the plurality of frequency bands by using the plurality of transmission powers;
   searching one frequency band corresponding to a maximum signal to interference and noise ratio among the plurality of frequency bands;
   recognizing a modulation and coding scheme control level corresponding to the maximum signal to interference and noise ratio; and
   generating scheduling control information including information on the one frequency band, a bandwidth corresponding to the one frequency band, and the modulation and coding scheme control level.

4. A method of performing uplink scheduling of a mobile station in a base station, the mobile station being located in a service cell of the base station, wherein
   at least one adjacent cell influenced by power of the mobile station exists, and the uplink includes a plurality of frequency bands that are different from one another, and
   the method of performing the uplink scheduling comprises:
   receiving interference amounts of the plurality of frequency bands corresponding to the at least one adjacent cell, respectively;
   calculating a plurality of interference values each corresponding to the plurality of frequency bands by using the plurality of interference amounts corresponding to the at least one adjacent cell, respectively;
   obtaining scheduling control information corresponding to the mobile station by using the plurality of interference values; and
   transmitting the scheduling control information to the mobile station,
   wherein the plurality of frequency bands comprises:
   a first frequency band that is commonly used in all of cells;
   a second frequency band that is commonly used in the service cell and the at least one adjacent cell and is allocated to a mobile station located at an edge of the service cell; and
   a third frequency band that is commonly used in the service cell and the at least one adjacent cell and is allocated to a mobile station located at an edge of the adjacent cell,
   wherein the obtaining of the scheduling control information corresponding to the mobile station comprises:
   generating a plurality of signal to interference and noise ratios each corresponding to the plurality of frequency bands by using the plurality of interference values;
   calculating a plurality of transmission power densities each corresponding to the plurality of frequency bands by using the plurality of signal to interference and noise ratios;
   calculating a plurality of bandwidths each corresponding to the plurality of frequency bands by using the plurality of transmission power densities;
   searching one frequency band corresponding to a maximum bandwidth among the plurality of frequency bands;
   recognizing a modulation and coding scheme control level corresponding to a signal to interference and noise ratio of the one frequency band; and generating scheduling control information including information on the one frequency band, the maximum bandwidth, and the modulation and coding scheme control level, wherein the signal to interference and noise ratio corresponds to signals that are capable of being received from the mobile station.

5. A method of performing uplink scheduling of a mobile station in a base station, the mobile station being located in a service cell of the base station, wherein at least one of adjacent cells influenced by power of the mobile station exists, and the method of performing the uplink scheduling comprises:

receiving interference amounts of a plurality of frequency bands corresponding to the at least one adjacent cell, respectively;

calculating a plurality of interference values each corresponding to the plurality of frequency bands by using the plurality of interference amounts each corresponding to the at least one adjacent cell;

calculating a plurality of transmission powers corresponding to the plurality of frequency bands by using the plurality of interference values;

generating scheduling control information corresponding to the mobile station by using the plurality of transmission powers; and transmitting the scheduling control information to the mobile station, wherein the uplink includes the plurality of frequency bands that are different from one another in that a first frequency band is commonly used in all of cells; a second frequency band is commonly used in the service cell and the at least one adjacent cell and is allocated to a mobile station located at an edge of the service cell; and a third frequency band is commonly used in the service cell and the at least one adjacent cell and is allocated to a mobile station located at an edge of the adjacent cell.

6. The method of claim 5, wherein the calculating of the plurality of transmission powers comprises:

in correspondence with the plurality of frequency bands, respectively, setting a power correction value of the related frequency band as a rising value when an interference value of the related frequency band is less than a first reference value, setting a power correction value of the related frequency band as a falling value when an interference value of the related frequency band is larger than a second reference value that is larger than the first reference value, and setting a power correction value of the related frequency band as a basic value when an interference value of the related frequency band is in the range of between the first reference value and the second reference value; and calculating the plurality of transmission powers by using a plurality of power correction values each corresponding to the plurality of frequency bands, respectively.

7. The method of claim 5, wherein the generating of the scheduling control information comprises:

calculating a plurality of signal to interference and noise ratios each corresponding to the plurality of frequency bands by using the plurality of transmission powers;

selecting one frequency band among the plurality of frequency bands by using the plurality of signal to interference and noise ratios;

recognizing a bandwidth corresponding to the one frequency band;

selecting a modulation and coding scheme control level corresponding to a signal to interference and noise ratio of the one frequency band; and generating scheduling control information including information on the one frequency band, the bandwidth, and the modulation and coding scheme control level.

8. The method of claim 7, wherein the calculating of the plurality of signal to interference and noise ratios comprises:

measuring a plurality of interference levels each corresponding to the plurality of frequency bands in the service cell, respectively; and calculating the plurality of signal to interference and noise ratios by using a path gain corresponding to the service cell, the plurality of interference levels, and the plurality of transmission powers, respectively.

9. The method of claim 7, wherein the selecting of the one frequency band comprises:

searching a maximum value among a signal to interference and noise ratio of the first frequency band, a signal to interference and noise ratio of the second frequency band multiplied by a predetermined weight value, and a signal to interference and noise ratio of the third frequency band; and selecting one frequency band corresponding to the maximum value, wherein the predetermined weight value is below 1.

10. A method of performing uplink scheduling of a mobile station in a base station, the mobile station being located in a service cell of the base station, and the method of performing the uplink scheduling comprises:

receiving a plurality of interference amounts each corresponding to a plurality of frequency bands in at least one adjacent cell corresponding to the mobile station from the base station of the at least one adjacent cell, respectively;

recognizing a plurality of interference values each corresponding to the plurality of frequency bands by using the plurality of interference amounts each corresponding to the at least one adjacent cell;

generating a plurality of signal to noise and interference ratios each corresponding to the plurality of frequency bands by using the plurality of interference values;

generating scheduling control information corresponding to the mobile station by using the plurality of signal to noise and interference ratios; and transmitting the scheduling control information to the mobile station, wherein the signal to interference and noise ratio is a factor with respect to signals that are capable of being received from the mobile station, wherein the uplink includes the plurality of frequency bands that are different from one another in that a first frequency band is commonly used in all of cells; a second frequency band is commonly used in the service cell and the at least one adjacent cell and is allocated to a mobile station located at an edge of the service cell; and a third frequency band is commonly used in the service cell and the at least one adjacent cell and is allocated to a mobile station located at an edge of the adjacent cell.

11. The method of claim 10, wherein the generating of the plurality of signal to noise and interference ratios comprises:

in correspondence with the plurality of frequency bands, respectively, setting a correction value of the related frequency band as a rising value when an interference value of the related frequency band is less than a first reference value, setting a correction value of the related frequency band as a falling value when an interference value of the related frequency band is larger than a second reference value that is larger than the first reference value, and setting a correction value of the related frequency band as a basic value when an interference value of the related frequency band is in the range of between the first reference value and the second reference value; and generating the plurality of signal to interference and noise ratios by using a plurality of correction values each corresponding to the plurality of frequency bands.

12. A method of performing uplink scheduling of a mobile station in a base station, the mobile station being located in a service cell of the base station, wherein the uplink includes a plurality of frequency bands different to one another, and the method of performing the uplink scheduling comprises:

receiving a plurality of interference amounts each corresponding to the plurality of frequency bands in at least one adjacent cell corresponding to the mobile station from the base station of the at least one adjacent cell, respectively;

recognizing a plurality of interference values each corresponding to the plurality of frequency bands by using the plurality of interference amounts each corresponding to the at least one adjacent cell;

generating a plurality of signal to noise and interference ratios each corresponding to the plurality of frequency bands by using the plurality of interference values;

generating scheduling control information corresponding to the mobile station by using the plurality of signal to noise and interference ratios; and transmitting the scheduling control information to the mobile station, wherein the signal to interference and noise ratio is a factor with respect to signals that are capable of being received from the mobile station, wherein the plurality of frequency bands comprise:

a first frequency band that is commonly used in all of cells;

a second frequency band that is commonly used in the service cell and the at least one adjacent cell and is allocated to a mobile station located at an edge of the service cell; and a third frequency band that is commonly used in the service cell and the at least one adjacent cell and is allocated to a mobile station located at an edge of the adjacent cell, wherein the generating of the scheduling control information comprises:

calculating a plurality of transmission power densities each corresponding to the plurality of frequency bands by using the plurality of signal to interference and noise ratios;

calculating a plurality of bandwidths each corresponding to the plurality of frequency bands by using the plurality of transmission power densities;

selecting one frequency band among the plurality of frequency bands by the plurality of bandwidths;

selecting a modulation and coding scheme control level by using a signal to interference and noise ratio of the one frequency band; and generating scheduling control information including information on the one frequency band, a bandwidth corresponding to the one frequency band, and the modulation and coding scheme control level.

13. The method of claim 12, wherein the calculating of the plurality of transmission power densities comprises:

measuring a plurality of interference levels each corresponding to the plurality of frequency bands in the service cell, respectively; and calculating the plurality of transmission power densities by using a path gain corresponding to the service cell, the plurality of interference levels, and the plurality of signal to interference and noise ratios, respectively.

14. The method of claim 12, wherein the selecting of the one frequency band comprises:

selecting a maximum value among a bandwidth of the first frequency band, a bandwidth of the second frequency band multiplied by a predetermined weight value, and a bandwidth of the third frequency band; and selecting one frequency band corresponding to the maximum bandwidth, wherein the predetermined weight value is below 1.

* * * * *